United States Patent [19]

Dubeck et al.

[11] 3,899,466

[45] Aug. 12, 1975

[54] BROMINATED XYLENE DIOLS

[75] Inventors: Michael Dubeck, Birmingham; David R. Brackenridge, Royal Oak, both of Mich.

[73] Assignee: Ethyl Corporation, Richmond, Va.

[22] Filed: May 25, 1973

[21] Appl. No.: 363,790

Related U.S. Application Data

[63] Continuation-in-part of Ser. No. 70,922, Sept. 9, 1970, abandoned.

[52] U.S. Cl... 260/45.95 L; 260/45.7 R; 260/618 D
[51] Int. Cl.............................................. C09k 3/28
[58] Field of Search.... 260/2.5 FP, 45.7 R, 45.95 L, 260/618 D, 651 R, 2.5 AJ, 2.5 AM; 106/15 FP; 252/8.1

[56] References Cited
UNITED STATES PATENTS

| | | | |
|---|---|---|---|
| 2,028,715 | 1/1936 | Hanson | 252/8.1 |
| 2,564,214 | 8/1951 | Ross et al. | 260/611 |
| 2,631,168 | 3/1953 | Ross et al. | 260/618 |
| 3,029,290 | 4/1962 | Lindemann et al. | 260/618 |
| 3,075,944 | 1/1963 | Wick et al. | 260/41 |
| 3,141,860 | 7/1964 | Sauer et al. | 260/33.8 |
| 3,220,858 | 11/1965 | Behr et al. | 106/15 |
| 3,347,822 | 10/1967 | Jenkner | 260/45.75 |
| 3,422,047 | 1/1969 | Cannelongo | 260/28.5 |
| 3,470,116 | 9/1969 | Praetzel et al. | 260/2.5 |
| 3,474,067 | 10/1969 | Praetzel et al. | 260/41 |

OTHER PUBLICATIONS

Hennion et al., JACS, Vol. 68, 1946, pp. 424 and 425.
Hilado, "Flammability Handbook for Plastics," 1969, pp. 82–85.

*Primary Examiner*—Donald E. Czaja
*Assistant Examiner*—R. A. White
*Attorney, Agent, or Firm*—Donald L. Johnson; John F. Sieberth; James M. Pelton

[57] ABSTRACT

Compounds having the formula:

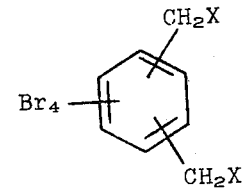

where X is a halogen, ester, hydroxyl, alkoxy, amine, cyanide, or isocyanate radicals. These compounds are useful as flame retardant additives for polymers, especially for polypropylene.

3 Claims, No Drawings

BROMINATED XYLENE DIOLS

CROSS REFERENCE TO RELATED APPLICATION

This application is a continuation-in-part of co-pending application Ser. No. 70,922, filed Sept. 9, 1970, now abandoned.

BACKGROUND OF THE INVENTION

Certain halogenated aromatic compounds are known in the art. For example, polychlorinated benzene and xylene compounds are disclosed in U.S. Pat. No. 2,564,214 and U.S. Pat. No. 2,631,168. Typical substituents on the methyl groups of the xylenes are chlorine, hydroxyl, methoxy, ethoxy, propoxy, carboxyl, acetate, isocyanate, chloroformate, thiol, and amino radicals. The compounds are stated to be useful as monomers for condensation reactions producing self-extinguishing resins, as heat transfer media, as modifiers for increasing the flash point of oils, in transformer fluids, lubricating media, and the like.

SUMMARY OF THE INVENTION

This invention relates to novel flame retardant polyolefin compositions comprising an $\alpha$-olefin polymer and a flame retardant amount of a tetrabrominated xylene compound. In the polyolefin composition the tetrabrominated xylene compound can have the general formula

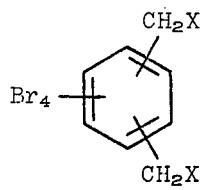

wherein X is selected from hydrogen, bromine and hydroxyl groups. Several of the tetrabrominated xylene compounds are novel compounds per se.

DESCRIPTION OF THE PREFERRED EMBODIMENTS

The novel compounds disclosed by the general formula above are derivatives of tetrabrominated xylene in which the methyl groups are substituted with various preferred radicals. This invention contemplates the novel compounds to include all the tetrabrominated xylene compounds; for example, the tetrabrominated o-, m- and p-xylenes.

A preferred group of derivatives of the halogenated compounds are those described by the general formula above wherein X is a radical selected from the group consisting of bromide, hydroxyl and acetate radicals. Of course, these derivatives include the o-, m- and p-isomers of the tetrabrominated xylenes.

A preferred substituent radical is a halogen radical. A most preferred halogen is bromine. Thus, the halogen can be the same as or different than that substituted on the aromatic nucleus of the xylene ring. Typical compounds in which the halogen are bromine are selected from the group consisting of $\alpha,\alpha'$-2,3,5,6-hexabromo-p-xylene, $\alpha,\alpha'$-3,4,5,6-hexabromo-o-xylene, and $\alpha,\alpha'$-2,4,5,6-hexabromo-m-xylene.

Another preferred substituent radical is the hydroxyl radical. Typical compounds in which the hydroxyl radical is substituted on the methyl groups of a tetrabrominated xylene compound are selected from the group consisting of 2,3,5,6-tetrabromo-p-xylene-$\alpha,\alpha'$-diol, 3,4,5,6-tetrabromo-o-xylene-$\alpha,\alpha'$-diol, and 2,4,5,6-tetrabromo-m-xylene-$\alpha,\alpha'$-diol.

Another preferred substituent radical is an ester radical. By the term "ester radical" is meant an organic acid in which the hydrogen is removed from the hydroxyl group, leaving a highly reactive species having the general formula

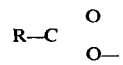

where R represents a hydrocarbon radical. The ester radicals may be selected from radicals having from one to about 20 carbon atoms. A preferred group of ester radicals contains from one to about 12 carbon atoms. A most preferred range of carbon atoms on the ester radicals is from one to four carbon atoms. Thus, typical ester radicals are formate, acetate, propionate, butyrate, hexanoate, heptanoate, octanoate, decanoate, laurate, tridecanoate, hexadecanoate, octadecanoate, eicosanoate, and the like. Among the compounds which may be prepared using the above radicals, a preferred group are prepared from the acetate radical. Thus, preferred compounds prepared using the acetate radical are selected from 2,3,5,6-tetrabromo-p-xylene-$\alpha,\alpha'$-diol diacetate, 3,4,5,6-tetrabromo-o-xylene-$\alpha,\alpha'$-diol diacetate, and 2,4,5,6-tetrabromo-m-xylene-$\alpha,\alpha'$-diol diacetate.

Another preferred radical is the alkoxy radical. Alkoxy radicals having from one to about 20 carbon atoms are useful for preparing novel compounds of this invention. Preferred alkoxy radicals have from one to about 12 carbon atoms, with the most preferred alkoxy radicals ranging from one to four carbon atoms. The compounds prepared using the alkoxy radicals are typically
2,3,5,6-tetrabromo-$\alpha,\alpha'$-dimethoxy-p-xylene,
3,4,5,6-tetrabromo-$\alpha,\alpha'$-diethoxy-o-xylene,
2,4,5,6-tetrabromo-$\alpha,\alpha'$-dipropoxy-m-xylene,
2,3,5,6-tetrabromo-$\alpha,\alpha'$-dibutoxy-p-xylene,
3,4,5,6-tetrabromo-$\alpha,\alpha'$-dipentoxy-o-xylene,
2,4,5,6-tetrabromo-$\alpha,\alpha'$-dioctoxy-m-xylene,
2,3,5,6-tetrabromo-$\alpha,\alpha'$-didecaoxy-p-xylene,
3,4,5,6-tetrabromo-$\alpha,\alpha'$-didodecaoxy-o-xylene,
2,4,5,6-tetrabromo-$\alpha,\alpha'$-dibutadecaoxy-m-xylene,
2,3,5,6-tetrabromo-$\alpha,\alpha'$-dihexadecaoxy-p-xylene,
3,4,5,6-tetrabromp-$\alpha,\alpha'$-diheptadecaoxy-o-xylene,
2,4,5,6-tetrabromo-$\alpha,\alpha'$-dinonadecaoxy-m-xylene,
2,3,5,6-tetrabromo-$\alpha,\alpha'$-dieicosaoxy-p-xylene.

Another preferred embodiment of the substituent radicals is an amine radical. Ammonia and the organic amines can be used as substituents on the methyl groups of tetrabrominated xylenes. Thus, organic amines having from one to about 20 carbon atoms are useful as substituent radicals. A preferred group of organic amines are those having from one to about 12 carbon atoms. Most preferred organic amines are those having from one to four carbon atoms.

The novel compounds of this invention can be prepared by brominating xylene and subsequently reacting the tetrabrominated xylene thereby produced by a free radical mechanism to substitute the methyl side chains. Tetrabromo-p-xylene can be prepared according to known methods by reacting a xylene with bromine in the presence of a Friedel-Crafts catalyst at about 0°C. Preparation of tetrabromo-p-xylene is illustrative of the preparation of various isomers and is illustrated in the following example. In this and other examples, all parts are by weight unless otherwise stated.

EXAMPLE I

In a glass resin flask, a mixture of 1,000 parts bromine and 3 parts of aluminum tribromide was cooled at 5°C and 83 parts of p-xylene were added dropwise with rapid stirring and continued cooling. After adding about three-fourths of the xylene, the reaction mixture became viscous forming large chunks of product. The mixture was diluted with 454 parts of bromine and the temperature was brought to 30°C. The heating and stirring gradually broke down the chunks of product to a fine powder. The mixture was then cooled to 15°C and the remaining xylene was added. Most of the excess bromine was removed by distillation. The solid was removed from the reaction flask and leached with cold methanol to remove excess bromine. The product was then dissolved in hot benzene and filtered. The solvent was then driven off and 323 parts (98.3% yield) of tetrabromo-p-xylene was obtained as crystals having the melting point of 253°–254°C.

The reaction procedure for preparation of the tetrabrominated-o- and m-xylenes is similar with the exception of using o- or m-xylene to replace p-xylene in the above example.

Tetrabromoxylene can then be brominated to prepare the compounds of this invention by reaction with additional bromine in the presence of a solvent and a source of irradiation for the production of free radicals. The preparation of $\alpha,\alpha'$-2,3,5,6-hexabromo-p-xylene is typical for the preparation of the brominated derivatives of this invention. Such preparation is illustrated in the following example.

EXAMPLE II

To a reaction flask equipped with a stirrer was added 42 parts of tetrabromo-p-xylene. This was then dissolved by adding 80 parts of carbon tetrachloride and the reaction flask was flushed with nitrogen. A nitrogen blanket was then maintained in the reaction flask. To this mixture was added 32 parts of bromine in carbon tetrachloride over a period of 2 hours while the reaction mixture was refluxing. A 150-watt light was positioned to shine into the flask during reaction. After rapid uptake of the bromine during the addition of the first one-half of the bromine, the solution became milky and a white solid began to precipitate. The refluxing was continued overnight and then the reaction mass was cooled to 0° to 5°C and the mixture was filtered and the crystals produced were washed with cold carbon tetrachloride. After drying, 55 parts of a white powder having melting points of 272.5° to 273.5°C were produced. The total yield of $\alpha,\alpha'$-2,3,5,6-hexabromo-p-xylene was 58 parts or about 99.5 percent. Analysis showed the following results: Percent bromine calculated — 82.8; found — 82.2.

The preparation of $\alpha,\alpha'$-3,4,5,6-hexabromo-o-xylene and $\alpha,\alpha'$-2,4,5,6-hexabromo-m-xylene is similar to Example II except tetrabromo-o- and m-xylenes, respectively, are used.

The tetrabrominated xylene diol diacetate is prepared by reacting the $\alpha,\alpha'$-dibromo derivative of tetrabromoxylene with a sodium salt of the ester to be substituted in the presence of a carboxylic acid reaction media. The preparation of 2,3,5,6-tetrabromo-p-xylene-$\alpha,\alpha'$-diol diacetate is illustrative.

EXAMPLE III

A mixture of $\alpha,\alpha'$-2,3,5,6-hexabromo-p-xylene, 25 parts, sodium acetate, 25 parts, and acetic acid, 420 parts, was heated in a reaction vessel to reflux with stirring. After heating and stirring for about 1 hour, the mixture appeared as a clear solution and then became cloudy after 2 hours. The mixture was then cooled and the acetic acid stripped from the reaction mixture. The resulting solid was triturated with water and the white residue resulting therefrom was filtered and air dried to yield 22.3 parts of 2,3,5,6-tetrabromo-p-xylene-$\alpha,\alpha'$-diol diacetate, melting at 232°–234°C. This represents a yield of about 96 percent.

Similar results are obtained when the $\alpha,\alpha'$-2,3,5,6-hexabromo-p-xylene is replaced by the similar ortho- and metahexabrominated xylene derivatives.

The diol derivatives can be prepared by reacting the tetrabromoxylene diol diacetate derivatives with water in the presence of an alkali metal hydroxide and an ether according to known procedures. The 2,3,5,6-tetrabromo-p-xylene-$\alpha,\alpha'$-diol is illustrative of the preparation of the diol derivative.

EXAMPLE IV

A solution of potassium hydroxide, 20 parts, in water, 50 parts, was added dropwise to a refluxing solution of 20 parts 2,3,5,6-tetrabromo-p-xylene-$\alpha,\alpha'$-diol diacetate, prepared as in Example III above, in p-dioxane, 200 parts. After 2 hours at reflux the mixture was cooled somewhat and the bulk of the dioxane-water removed by a rotary evaporator. Water was added to the semi-solid residue, the precipitate filtered, washed with water and air dried to give crude diol, 16.7 parts. Recrystallization from dioxane-water gave 12.2 parts 2,3,5,6-tetrabromo-p-xylene-$\alpha,\alpha'$-diol, melting at 262°–263.5°C. A second crop, 3.95 parts, melted at 260°–262°C. A third crop, 0.4 parts, melted at 225°–245°C. Combining the first two crops gives a yield of 96 percent. Analysis showed the following results: Percent bromine calculated — 70.5; found — 71.5.

Following the procedures outlined in the preceding examples, various other preferred tetrabrominated xylene derivatives can be produced according to this invention. In general, the alkoxy derivative of tetrabrominated xylenes can be prepared by reacting $\alpha,\alpha'$-2,3,4,5-hexabromo-o-xylene, for example, with an alkali metal alkoxide of the desired carbon chain length or the alkali metal hydroxide and the desired alcohol in water. For example, the preparation of 2,3,4,5-tetrabromo-$\alpha,\alpha'$-diethoxy-o-xylene can be made by reacting $\alpha,\alpha'$-2,3,4,5-hexabromo-o-xylene with aqueous sodium hydroxide in excess ethanol under reflux conditions. Further illustrating the preparation of the alkoxy derivative of various tetrabrominated xylene isomers, the following alcohols can be used: ethanol, propanol, butanol, pentanol, octanol, decanol, dodecanol, tetradecyl alcohol, cetyl alcohol, carnaubyl alcohol, ceryl alcohol, melissyl alcohol, tarchonyl alcohol and the like.

Other preferred tetrabrominated xylenes are the amine derivatives. For example, 2,3,5,6-tetrabromo-p-xylene-$\alpha,\alpha'$-diamine can be prepared by reacting α,α'-2,3,5,6-hexabromo-p-xylene with ammonia in the presence of an excess of lutidine solvent. Similarly the ortho and meta isomers of the hexabrominated xylene may be used and the ammonia can be replaced with various organic amines having from one to about 20 carbon atoms. In addition, various forms of amines can be employed such as liquid ammonia or sodamide. Likewise, the various solvents may be used so long as the reactants are at least slightly soluble in the solvent and the solvent is substantially inert under the reaction conditions. Preferably, the organic amine may have from one to about four carbon atoms, such as methyl amine, ethyl amine, propyl amine, butyl amine and their various isomers. The primary amine is preferred.

Another preferred embodiment of the tetrabrominated xylene derivatives of this invention is the preparation of the cyanide derivative from the hexabrominated xylenes. Generally, the cyanide derivative is prepared by replacing the bromine on the methyl groups of the hexabrominated xylene with a suitable source of cyanide ions such as potassium cyanide, sodium cyanide, hydrogen cyanide and the like, in the solvent such as dimethylformamide, tetrahydrofuran and the like. Illustrative of this process is the preparation of 2,3,5,6-tetrabromo-p-xylene-α,α'-dinitrile. This compound can be made by reacting α,α'-2,3,5,6-tetrabromo-p-xylene dissolved in excess dimethylforamide with potassium cyanide. Of course, the hexabrominated ortho- and meta-xylene isomers may also be used in the starting material to produce the corresponding dinitrile. The dinitrile derivatives can be hydrogenated according to well known techniques to produce a diamine derivative. This is a further alternative to the production of the tetrabrominated xylene diamines described hereinabove. A further alternative within the scope of this invention is the hydrolysis of the dinitrile with base such as alkali or alkaline earth metal hydroxide to produce the alkali or alkaline earth metal salts of carboxylic acid having one more carbon atom than the methyl group originally found on xylene.

Another preferred embodiment of this invention is the isocyanate derivative of tetrabrominated xylene. In general, the isocyanate derivative can be prepared by reacting the hexabromoxylene with an alkali metal isocyanate, preferably sodium or potassium isocyanate, in a suitable solvent. Suitable solvents for the preparation of tetrabrominated xylene isocyanates are dipolar solvents, such as, tetrahydrofuran or dimethylforamide. As an illustration of the preparation of these isocyanate derivatives,2,3,5,6-tetrabromo-p-xylene-α,α'-diisocyanate can be produced by reacting α,α'-2,3,5,6-hexabromo-p-xylene in an excess of dimethylformamide as a solvent with potassium isocyanate. Of course the ortho- and meta-xylene derivatives may be used to produce corresponding diisocyanate derivatives.

It should be understood by one skilled in the art that having prepared the novel hexabrominated xylene compounds, the bromine atoms attached to the methyl groups may be replaced by other functional groups according to known procedures of classical organic chemistry. Thus, the nitro, aldehyde, keto, thiol, sulfate, phosphate and like derivatives may be prepared, for example, from α,α'-2,3,5,6-hexabromo-p-xylene.

The novel compounds of this invention are useful as chemical intermediates, monomers for condensation resins, and additive or reactive-type flame retardants.

For example, the α,α'-3,4,5,6-hexabromo-o-xylene may be hydrolyzed with water to form the diol and then oxidized to form tetrabromophthalic acid. This compound is a well-known flame retardant for polyester resins.

The novel compounds of this invention may also form reaction products with a wide variety of complementary functional groups. For example, among the types of reactants with which the novel compounds of this invention may be condensed are alcohols, mercaptans and amines. As examples of the polyfunctional reactants with which reactions are possible, there may be mentioned ethylene glycol, propylene glycol, butylene glycol, diethylene glycol, triethylene glycol, dipropylene glycol, dimethanol dimethyl methane, 2-mercapto methanol, dihydroxy ethyl sulfide, glycerol, trimethanol ethyl methane, d-sorbitol, d-sorbose methanol, hydroxy ethyl cellulose, propylene dimercaptan and hexamethylene diamine.

In the instances where hydroxyl, diol and/or amino radicals constitute the functional groups in the novel compounds of this invention, they may be reacted with acids, acid anhydrides and acid chlorides; such as, succinic acid, sebacic acid, adipic acid, pimelic acid, suberic acid, azelaic acid, undecanedioic acid, dodecanedioic acid, tetradecanedioic acid, octadecanedioic acid, agathic acid, phthalic acid, and terephthalic acid. The anhydrides such as maleic anhydride and phthalic anhydride and the chlorides of the foregoing acids may also be used.

In general, the tetrabrominated xylene derivatives of this invention can be used as additive-type flame retardants for polymers or resins of either the thermoplastic or thermosetting type. Standard methods for incorporating additives, such as stabilizers, plasticizers, fillers and the like, into polymers or resins can be employed to add the flame retardant materials of this invention. Typically, a flame retardant amount of the tetrabrominated xylene derivative is added. By flame retardant amount is meant an amount sufficient to decrease the flammability of the polymer or resin. Generally, from about 2 to about 40 weight percent of the tetrabrominated xylene derivative can be used. Preferably, from about 5 to about 25 weight percent is added to the polymer or resin. It should be recognized that greater or lesser amounts can be employed, taking into account the polymer or resin substrate and whether or not the flame retardant of this invention is used in conjunction with another flame retardant additive.

Further, the tetrabromoxylene diols and diacetate may be used as reactive-type flame retardants. Incorporation and reaction with other monomers, as described hereinbelow, requires substantially similar amounts as the additive-type materials.

In addition, another embodiment of this invention employs the starting material for the novel compounds of this invention, tetrabromoxylene, as an additive-type flame retardant for polymers and resins. Tetrabromoxylene can be employed at from about 2 to about 40 weight percent based on the polymer or resin into which it is incorporated. The method of incorporation is well within the skill of the art.

Accordingly, a preferred embodiment of this invention is a flame retardant polymer composition comprising a polymer or resin and a flame retardant amount of a compound having the formula

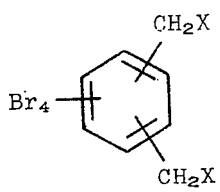

wherein X is selected from hydrogen, bromine, hydroxyl and acetoxy groups.

Flame retardant compounds of the present invention may be incorporated into the α-olefin polymers, for example, homo and copolymers containing as the major constituent ethylene, propylene, butylene, isobutylene and similar monomer units. Copolymers of the foregoing with the vinyl-type monomers, such as vinyl halides, vinylidene halides, vinyl acetates, vinyl butyrals, butadiene copolymers, acrylonitrile-butadiene-styrene polymers, acrylonitriles, the acrylate and methacrylate polymers, for example, acrylic acid, methacrylic acid, methacrylate, ethyl acrylate, propyl acrylate, butyl acrylates, amyl acrylates, hexyl acrylates and their corresponding alkyl methacrylates, as well as monomers such as trichloroethylene, dimethyl maleate, vinyl butyl ether, butadiene, vinyl alcohol, maleic anhydride, carbon monoxide, ethyl acetate and the like.

Another preferred embodiment of this invention is a polyolefin composition comprising an α-olefin polymer and a flame retardant amount of a tetrabrominated xylene compound. More preferable is a flame retardant polyolefin composition comprising α-olefin polymer and a flame-retardant amount of a tetrabrominated xylene compound having the formula

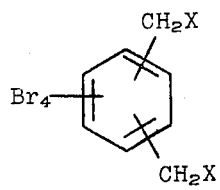

wherein X is selected from hydrogen, bromine and hydroxyl groups. A preferred α-olefin polymer of the above composition is polypropylene. Preferred flame retardant compounds are tetrabromoxylene, hexabromoxylene and tetrabromoxylene diols. More preferred flame retardant α-olefin polymers are polypropylene containing tetrabromoxylene and polypropylene containing hexabromoxylene. More preferably, each of the hereinabove disclosed isomeric forms of tetrabromoxylene, hexabromoxylene, and tetrabromoxylene diols can be used in the flame retardant polypropylene of this invention.

In general, the polypropylene compositions according to this invention can be prepared according to methods known in the art, see Kirk-Othmer, *Encyclopedia of Chemical Technology*, Vol. 14, pp. 282–309. Thus, the polymers of polypropylene according to this invention polypropylene compositions suitable for sheet film and filament, fiber, foam, rod, elastomeric polymers and the like are contemplated. Such polymers are suitable for injection molding, blow molding, compression molding, thermoforming or vacuum forming, wire and cable covering and coating applications. Of course, the polypropylene compositions can also contain various known plasticizers, stabilizers, chain, terminators, color improvers, delustrants, diluents, reinforcing materials and the like.

Another preferred embodiment of this invention is a flame retardant composition comprising a polyester resin and a flame retarding amount of a compound having the formula

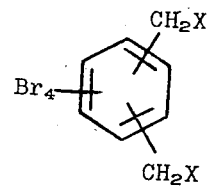

wherein X is selected from hydrogen, bromine, hydroxyl, and acetoxy groups. The novel flame retardant compositions of this invention can be prepared by incorporating the above brominated xylene compounds into a polyester produced by reacting a polyhydric alcohol and a dicarboxylic acid or its anhydride. Typically, an aliphatic unsaturated dicarboxylic acid or anhydride, such as maleic acid or maleic anhydride, or an aromatic dicarboxylic acid or anhydride, such as phthalic acid or phthalic anhydride, or mixtures of these, are used. Polyhydric alcohols, such as ethylene glycol, propylene glycol, neopentyl glycol, and the like, are typical of those preferred.

The brominated xylene compounds are preferably used in amounts corresponding to a polyester containing from 10 to 40 percent by weight of the brominated xylene compound and sufficient to provide a total of from about 5 to 25 percent by weight of bromine in the product.

The polyester composition can be prepared by reacting a dicarboxylic acid and a polyhydric alcohol according to methods known in the art, see Kirk-Othmer, *Encyclopedia of Chemical Technology*, Vol. 16, pp. 143–189, Interscience Publishers, New York, N.Y., and the references there included. In addition to the flame retardant compounds of this invention, the polyester can also include stabilizers, chain terminators, color improvers, delustrants and the like.

The novel compounds of this invention can be added to the polyester. However, the tetrabrominated xylene diols, which are polyhydric alcohols, can be incorporated into the polymer chain as a reactive species. Accordingly, 2,3,5,6-tetrabromo-p-xylene-α,α'-diol, for example, ethylene glycol, maleic anhydride and phthalic anhydride can be reacted at reflux temperature to produce a resin product. The resin can be cooled and styrenated and polymerized with t-butylhydroperoxide to produce a self-extinguishing polymer. Similarly, self-extinguishing polymers can be prepared using the diacetoxy derivative of tetrabrominated xylene.

When carrying out the preparation of flame retarded polyesters with the tetrabrominated or hexabrominated xylenes, the material is not incorporated into the polyester chain but is in contrast an additive-type flame retardant. Thus, the polyester resin may be prepared beforehand and the flame retarding agent incorporated during polymerization or after polymerization by blending into the polymer using known procedures.

Thus, the tetrabrominated or hexabrominated xylene may be added by milling with the resin, for example, on a two-roll mill, in a Banbury mixer, or by simultaneous molding, such as by extruding with the resin. Additionally, the tetrabrominated or hexabrominated xylene may be added during resin manufacture, e.g., during polymerization, provided the catalyst and other ingredients of the polymerization system are inert to the tetrabrominated or hexabrominated xylene or the polymerization conditions are not deleterious. The following example illustrates the incorporation of the novel compounds of this invention into a polyester resin as an additive-type flame retardant. All parts are by weight unless otherwise indicated.

EXAMPLE V

To 100 parts of polyester resin (General Purpose Resin Polylite 31-007 from Reichold Chemical) containing 57 weight percent with 42–43 weight percent styrene was added 12.08 parts of $\alpha,\alpha'$-2,3,5,6-hexabromo-p-xylene and 1 part of benzoyl peroxide curing agent. The polyester resin was cured between glass plates which were gasketed and clamped together. The mixture was allowed to gel overnight at 50°C in an oven. The glass plates, clamps and gasket were removed and the polyester sheet was post-cured at 80°C for 3 hours. Samples were cut from the sheet and tested according to ASTM-D-2863-70 for flammability.

Similar procedures were followed for preparing flame retardant polyester sheet containing 13.08 parts of tetrabromo-m-xylene and tetrabromo-p-xylene and 12.08 parts of $\alpha,\alpha'$-2,4,5,6-hexabromo-m-xylene. The results of these tests are shown on the table below.

Similar results are obtained using the diol and diol diacetate derivatives of the tetrabrominated xylene compounds, but, of course, they are more preferably employed as reactive-type flame retardant additives according to the procedure as illustrated hereinabove. These flame retardant additives may likewise be incorporated into polyethylene, polypropylene, polystyrene, polybutylene, acrylonitrile-butadiene-styrene, and the like.

EXAMPLE VI

To 45 g of general purpose polypropylene resin (Profax-6523 from Hercules Powder) was added 5.44 g (12.08 weight percent) of 60, $\alpha'$-2,3,5,6-hexabromo-p-xylene and 0.9 (2 wt %) g of chopped fiber glass. The ingredients were mixed initially by hand and then for 3 minutes in a Waring Blender to assure substantially complete homogeneity. Then 45 g of this mixture was charged into a chase-type mold measuring 6 inches × 4 inches × ⅛ inch. The mixture was covered with mirror-finish aluminum foil and placed in a heated press. After 1½ minutes warm-up, the pressure was increased to 10,000 psig and held for 1½ minutes at 400°F. The assembly was then removed from the press and quenched in cold water. The molded sheet was cut into 10 long samples which were used to test the flammability of the flame retarded polypropylene in accordance with ASTM-D-2863-70. The results of this test are given in the table below.

Similar procedures are used to prepare flame retardent polypropylene containing 12.08 weight percent of $\alpha,\alpha'$-2,4,5,6-hexabromo-m-xylene and 13.08 weight percent of tetrabromo-p- and m-xylene.

As well as being a reactive-type flame retardant, the tetrabrominated xylene diol can also be added to polypropylene and polyester as an additive-type flame retardant according to the procedures of Examples V and VI.

In addition, the hexabrominated xylenes may be incorporated with the polyester resin as a reactive-type flame retardant by reacting in a polyester resin to eliminate HBr. Thus, the $\alpha,\alpha'$-3,4,5,6-hexabromo-o-xylene may be reacted with maleic acid or anhydride, phthalic acid or anhydride and a polyhydric alcohol, such as ethylene glycol, to form a self-extinguishing polyester resin.

FLAMMABILITY TESTING IN POLYESTER AND POLYPROPYLENE

| Compound | Loading (Wt. %) | ASTM-D-2863-70 LOI Polypropylene* | Polyester |
|---|---|---|---|
| Blank | — | 18.0 | — |
| Blank | — | — | 18.4 |
| 2,3,5,6-Tetrabromo-p-xylene-$\alpha,\alpha'$-diol | 14.2 | 20.6 | 19.7 |
| 2,3,5,6-Tetrachloro-p-xylene-$\alpha,\alpha'$-diol | 14.2 | 18.7 | 20.0 |
| Tetrabromo-p-xylene | 13.08 | 20.6 | 20.6 |
| Tetrachloro-p-xylene | 13.08 | 19.5 | 20.1 |
| Tetrabromo-m-xylene | 13.08 | 20.6 | 19.6 |
| Tetrachloro-m-xylene | 13.08 | 20.0 | 20.8 |
| 2,3,5,6-Tetrabromo-p-xylene-$\alpha,\alpha'$-dibromide | 12.08 | 21.4 | 19.4 |
| 2,3,5,6-Tetrachloro-p-xylene-$\alpha,\alpha'$-dibromide | 12.08 | 20.2 | 20.6 |
| 2,4,5,6-Tetrabromo-m-xylene-$\alpha,\alpha'$-dibromide | 12.08 | 21.4 | 20.8 |
| 2,4,5,6-Tetrachloro-m-xylene-$\alpha,\alpha'$-dibromide | 12.08 | 20.0 | 21.4 |

*Polypropylene formulations contains 2 wt % fiber glass.

From the foregoing data, it can be seen that the fire retardant of this invention, that is, the 2,3,5,6-tetrabromo-p-xylene-$\alpha,\alpha'$-diol is an effective additive to both polypropylene and polyester. In each case, the LOI was increased on addition of the tetrabrominated-xylene-diol. Further, the tetrabrominated-xylene-diol was clearly superior to its chlorinated analog in polypropylene and about the same in polyester, the difference being only 0.3 LOI numbers. It should be pointed out that polyester is difficult to test by the LOI method because of its formulation and burning characteristics.

Further, these results show that the use of either tetrabromoxylene or hexabromoxylene has the effect of increasing the LOI, i.e., increasing the resistance to flammability, over the base polypropylene or polyester containing no flame retardant. In addition, the tetrabromoxylene in each case was superior to its chlorinated analog in polypropylene and was better in one case in polyester. Although tetrabromoxylene, the starting material for the novel tetrabrominated xylene derivatives of this invention, is a known compound, it is believed that flame retarded polypropylene and polyester compositions containing tetrabromoxylene have not heretofore been disclosed.

The results of the novel tetrabromoxylene-$\alpha,\alpha'$-dibromides are clearly superior to the ring chlorinated analog in polypropylene and somewhat less effective in polyester. However, it is believed that flame retarded polyester and polypropylene compositions containing tetrabromoxylene-$\alpha,\alpha'$-dibromides have not heretofore been disclosed.

Similar results are obtained when tetrabromo-o-xylene is used as the flame retardant in polypropylene and polyester at from 2 to about 40 weight percent. Similar results in polypropylene are obtained when 3,4-,5,6-tetrabromo-o-xylene-α,α'-dibromide is employed at from about 2 to about 40 weight percent.

Similar results are obtained in polypropylene and polyester using from about 5 to about 25 weight percent of tetrabromo-p-and m-xylene. Similar results using 2,3,5,6- and 2,4,5,6-tetrabromo-p- and m-xylene-α,α'-dibromide are obtained at 2 to about 25 weight percent in polypropylene.

What is claimed is:

1. A polyolefin composition comprising an α-olefin polymer and a flame retardant amount of a tetrabrominated xylene compound of the general formula wherein X is a hydroxyl radical.

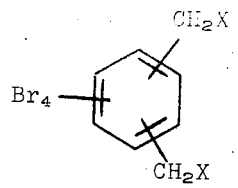

2. The composition of claim 1 wherein said α-olefin polymer is polypropylene.

3. The composition of claim 1 wherein said α-olefin polymer is polypropylene and said tetrabrominated xylene compound is 2,3,5,6-tetrabromo-p-xylene-α,α'-diol which is present at from about 2 to about 25 weight percent based upon said polypropylene.

* * * * *